S. A. BEYLAND.
SIGNALING DEVICE.
APPLICATION FILED OCT. 16, 1911.

1,189,781.

Patented July 4, 1916.

Witnesses
E. G. Spurr
A. D. T. Libby

Inventor
Sidney A. Beyland
By J. O. Richey
His Attorney

UNITED STATES PATENT OFFICE.

SIDNEY A. BEYLAND, OF ELYRIA, OHIO, ASSIGNOR, BY MESNE ASSIGNMENTS, TO THE GARFORD MANUFACTURING COMPANY, OF ELYRIA, OHIO, A CORPORATION OF OHIO.

SIGNALING DEVICE.

1,189,781.  Specification of Letters Patent.  Patented July 4, 1916.

Application filed October 16, 1911. Serial No. 655,062.

*To all whom it may concern:*

Be it known that I, SIDNEY A. BEYLAND, a citizen of the United States, residing at Elyria, in the county of Lorain and State of Ohio, have invented certain new and useful Improvements in Signaling Devices; and I do hereby declare the following to be a full, clear, and exact description of the invention, such as will enable others skilled in the art to which it appertains to make and use the same.

My invention relates to signaling devices, and more particularly to automobile horns which are operated by air. Ordinarily such devices employ a vibratory member, such for example as a reed. Air is supplied to this member by a conduit in which the reed may be mounted. For efficiency in manufacture, and for other reasons this reed is mounted upon a support independent of the conduit, and is placed therein. In the form to which my invention is more particularly applicable, the reed is mounted upon a support, which is slipped inside of the conduit. It has been found that this reed is shaken loose, owing to the jarring of the machine, or by some other agency.

I aim to provide means for retaining the reed in its position, such as, for example, may be easily and cheaply constructed with standard tools.

Figure 3:
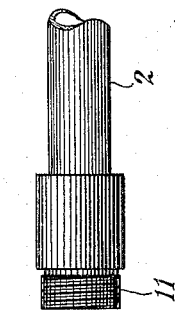
Figure 2:
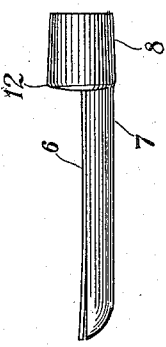
Figure 4:
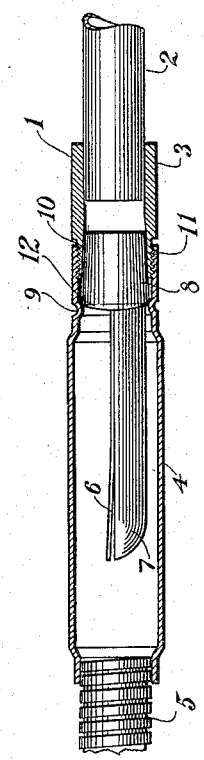
Figure 1:
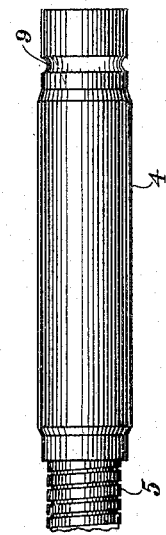

Figure 1 shows a portion of the conduit. Fig. 2 shows the reed which is placed therein. Fig. 3 shows a second portion of the conduit. Fig. 4 is a cross section through the parts shown in Figs. 1, 2 and 3 after they have been connected together.

Referring now to the drawings, and more particularly to the specific form of the invention shown therein, at 1 I show a conduit which is suitable for transmitting air through the reed and causing the same to vibrate to produce the desired signal. This conduit is preferably broken up into parts, and when so separated, there are at least two parts, such as a duct casing 3, and a chamber casing 4. At 5 I show another portion of the conduit which is ordinarily shown as a flexible duct, it being my purpose to employ a duct of this character where convenient. Another part is shown at 4, consisting of a rigid duct. This character of duct may be employed where convenient.

At 11 I show suitable means, such as threads, for connecting the parts 3 and 4 together.

At 6 is shown the vibratory member, ordinarily shown as a vibratory reed, which when vibrated, produces the desired signal. The reed 6 is preferably connected to a supporting member 8, preferably frusto-conical shape, with the small end here shown opposite to that end to which the reed is attached. A bill 7 here associated with the reed is also attached to this support.

A socket which is better formed with inclined walls is shown at 10 in the conduit in the particular form of the invention illustrated in the drawings. This socket is formed at the junction of the two conduit members 3 and 4. Heretofore it has been customary to drive the reed support into this socket, and fasten the parts 3 and 4 together. It has been found that in use, the reed and its support will be jarred loose, changing the tone produced by the horn, and otherwise interfering with its operation.

I provide suitable means for retaining the reed in position, and thus preserving the proper tone and operation of the horn. In the form shown, this is accomplished by a member 9, such as a ring which may be depressed from the walls of the conduit, and which may be integral with said walls. This means is easily and cheaply constructed by standard apparatus, efficiently performing its functions, and at the same time adding but little expense to the construction of the signaling device.

The apparatus is assembled by driving the support into the socket in the part 3, the same being retained therein by the shape of the parts, though I may provide special means for this without departing from the spirit of my invention. The parts 3 and 4 are thus screwed together until the member 9 engages the shoulder 12 upon the support 8. The edges of the member 9 and the shoulder 12 of the support 8 are each inclined or curved, as shown, so that when the parts 3 and 4 are drawn together by the threads, these inclined or curved edges cause the part of the member 4 shown at 9 to ride up part way upon the support, pushing down the threaded parts so that they engage in a grip which cannot be broken by jarring. The parts are thus always under such a tension that they are not shaken loose. It will be seen that the reed support will then be firmly clamped between the member 9 and the walls of the socket, firmly holding the reed in place.

While I have illustrated and described this specific embodiment of my invention, I do not wish to be limited thereto as it will be apparent to anyone skilled in the art that numerous and extensive departures from the form and details thereof may be made without departing from the spirit of the invention.

I claim:

1. In a device of the class described, the combination of a duct casing having a portion of the bore thereof conical shaped, a frusto-conical shaped supporting member driven into and engaging the conical part of the bore, a reed mounted on said support, a shoulder on said support and an annular member provided on said casing engaging the shoulder on the support to hold the support and reed in place.

2. In a device of the class described, the combination of a hollow casing having a frusto conical shaped socket formed in a portion of the bore thereof, a frusto-conical shaped supporting member driven into said socket, a reed carried by said supporting member, a shoulder on said supporting member, and an annular member provided on the casing engaging such shoulder to hold said supporting member in position.

3. In a device of the class described, the combination of a sound conduit, a vibratory sound producing reed mounted therein, a support for said reed having a curved or inclined shoulder, means acting positively to prevent the movement of the reed support in one direction in said conduit and an inclined or curved member on said conduit engaging the inclined or curved shoulder upon the reed support when the parts are assembled.

4. In a device of the class described, the combination of a sound conducting duct, having a socket therein with inclining walls, a vibratory sound producing device in said duct, a frusto-conical shaped support for said sound producing device, said support being mounted in said socket, and said duct being provided with a ring engaging the outer end of the support, and retaining said sound producing device in position in said duct.

5. In a device of the class described, the combination of a duct casing, a chamber casing, means to attach said casings together, a vibratory sound producing device mounted in said casings, inclined walls in said casings forming a socket therein, a frusto-conical shaped support for said sound producing device, and said chamber casing being provided with a ring adapted to engage said support when said casings are fastened together to retain said sound producing device in position in said casing.

6. In a device of the class described, the combination of a conduit having a socket therein, a reed and a support therefor, said support having a curved or inclined edge and fitting in said socket, and an annular depression in said conduit wall having a curved or inclined edge engaging the curved or inclined portion of the shoulder on the reed support, said parts retaining said reed in position in said conduit when assembled.

7. In a device of the class described, the combination of a casing duct having a portion of its bore frusto-conical shaped with smooth walls on the inside, a reed supporting member having smooth walls driven into such portion of such casing and a reed supported by such member, such casing being provided with means to retain such member in the bore.

8. In a device of the class described, the combination of a duct casing and a chamber casing complementarily threaded, a socket in one of said casings, a reed, a supporting member for said reed adapted to fit in said socket, said support having an inclined or curved shoulder, a member on one of said casings having an inclined or curved shoulder engaging the inclined or curved shoulder on the reed support when the casings are screwed together, the inclined or curved member of the casing riding up on the inclined or curved surface of the shoulder of the support to expand the adjacent section of the casing.

9. In a device of the class described, the combination of a section of duct casing having a threaded portion of springy material bored out conically on the inside and threaded on the outside, a reed support having inclined walls adapted to be inserted into the conical casing of said portion of duct casing, an inclined or curved shoulder at one end of the reed support, a second section of duct casing threaded on the inside to engage the threads on the outside of the first mentioned section, an inclined or curved shoulder upon said second section for engaging the shoulder on the reed support, said shoulders engaging when the parts are drawn down upon the threads, the shoulder on the casing riding upon the shoulder on the reed support and causing the threaded portions to firmly engage each other, and a reed supported in said casing by said reed support.

In testimony whereof I affix my signature in the presence of two witnesses.

SIDNEY A. BEYLAND.

Witnesses:
F. O. RICHEY,
A. D. T. LIBBY.